United States Patent [19]

Rozentals

[11] 3,733,666
[45] May 22, 1973

[54] SPHERICAL BEARING ASSEMBLY
[75] Inventor: Alfreds R. Rozentals, Fairfield, Conn.
[73] Assignee: Heim Universal Corporation, Fairfield, Conn.
[22] Filed: Oct. 14, 1971
[21] Appl. No.: 189,304

Related U.S. Application Data

[62] Division of Ser. No. 887,217, Dec. 22, 1969, Pat. No. 3,614,182.

[52] U.S. Cl. .................................. 29/149.5 B, 29/441
[51] Int. Cl. ............................................. B23p 11/00
[58] Field of Search ........................ 29/149.5 B, 441; 308/72

[56] References Cited

UNITED STATES PATENTS 3,614,182  10/1971  Rosentals .............................. 308/72

Primary Examiner—Thomas H. Eager
Attorney—John R. Bronaugh, George R. Powers and Floyd S. Levison

[57] ABSTRACT

A self-aligning, spherical bearing assembly comprising a first and second housing member, each of said housing members having circular openings therethrough with each opening being defined by a spherical seating portion, a spherical ball rotatably enclosed within said housing members and in alignment with said openings and seated on said spherical seating portions, interlocking means integral with at least one of said housing members for mechanically interlocking said first housing member to said second housing member.

5 Claims, 20 Drawing Figures

PATENTED MAY 22 1973

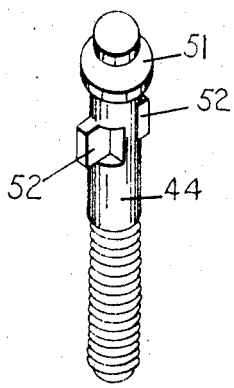 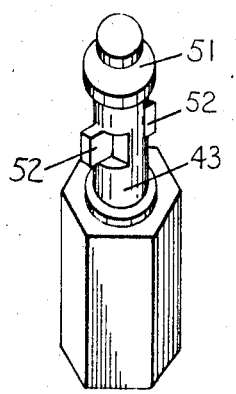 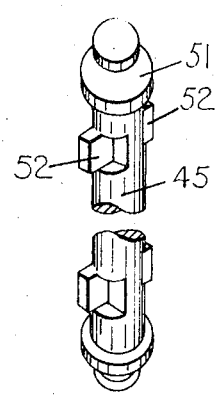 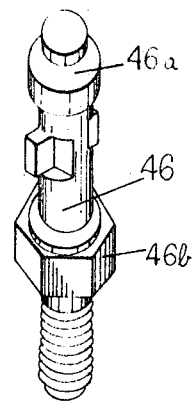
Fig.11  Fig.12  Fig.13  Fig.14
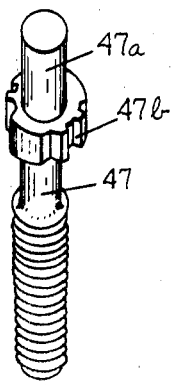 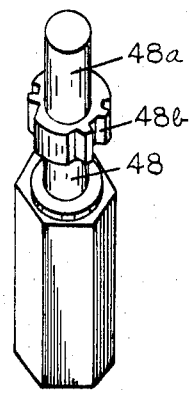 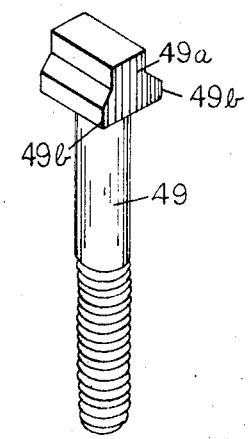 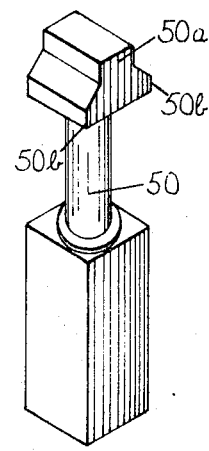
Fig.15  Fig.16  Fig.17  Fig.18
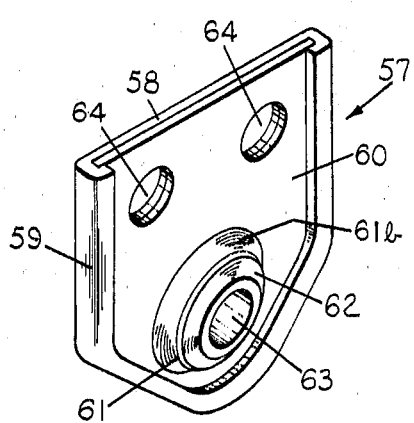 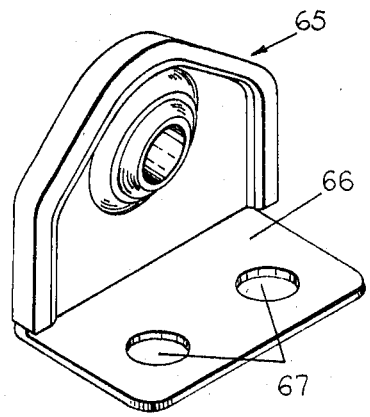
Fig.9  Fig.10

SPHERICAL BEARING ASSEMBLY

This is a division, of application Ser. No. 887,217, filed Dec. 22, 1969, U.S. Pat. No. 3,614,182.

BACKGROUND OF THE INVENTION

This invention relates to spherical bearing assemblies, including rod end spherical bearings and pillow block bearings, and the like, having high load carrying capacities for use in a wide variety of operational uses and environments where durability and long life are both expected and required.

Rod end bearings, for example, have found wide acceptance in the aircraft industry where their superior self-aligning characteristics and durability have greatly improved and reliability and safety of control system linkages.

Rod end bearings have also found similar acceptance in linkages of certain systems on road vehicles and marine vessels.

However, there are many instances where their applications have been limited or precluded due to cost or quality considerations. Typically in the past, acceptable quality spherical bearings required complicated, precise, and expensive machining and assembly operations.

Similar problems of obtaining the necessary quality with economy have been experienced in the manufacture of other spherical bearing assemblies, such as pillow blocks.

The major thrust of the prior art in attempting to resolve this problem was in reducing the machining operations. One such example of the prior art involved the use of an extruded tube in which the spherical ball was inserted and the tube was deformed about the ball and shaped into a rod end bearing assembly. Other examples involved the use of stamped housings welded or rivited together.

While much of the prior art is directed toward the same problems that the present invention is directed toward, they all failed to achieve a simplified and inexpensive spherical bearing assembly capable of carrying sustained heavy loading during operational use. The prior art can be characterized as being either as expensive as their predecessor bearings (in some cases even more expensive) and/or lacking the necessary strength, reliability, and/or durability.

Accordingly, it is the general object of the present invention to provide a spherical bearing assembly which will be inexpensive to manufacture and will equal or exceed the life, reliability, and load carrying characteristics of, and be generally interchangeable with, the "machined" type spherical bearing.

It is a further object of this invention to provide a spherical bearing which is assembled by mechanically interlocking two easily fabricated housings, using interlocking means integral with at least one of the housings, in a simplified assembly operation wherein the spherical ball member assists in aligning the two housings during assembly.

It is yet another object of this invention to provide a spherical rod end bearing of the self-aligning type having two housing members, each of the housing members having semi-circular portions defining a cylindrical groove and matching circular openings through the housing members, each of the openings being defined by a spherical seating portion, a spherical ball rotatably enclosed within said housings and in alignment with said openings and seated on said seating portions, a stud fixedly enclosed within said housing at the cylindrical groove, at least one of the housing members having raised portions for foling upon the other housing member for mechanically interlocking the two housing members together.

Still another object of this invention is to provide a method of making an inexpensive, sheet metal, mechanically interlocked, spherical bearing assembly which accomplishes the above objectives.

Other objects and advantages of the invention will become apparent as the present invention is better understood from the following disclosure and as shown in the accompanying drawings.

DESCRIPTION OF THE DRAWINGS

FIG. 9 is a view in perspective of another mechanically interlocked self-aligning spherical bearing assembly in accordance with the present invention;

FIG. 10 is a view in perspective of a modification of the spherical bearing assembly of FIG. 9;

FIGS. 11 through 19, inclusive, are views in perspective of a variety of stud configurations that may be used in connection with the bearing assembly in FIG. 1.

DETAILED DESCRIPTION OF THE INVENTION

Figure 1:
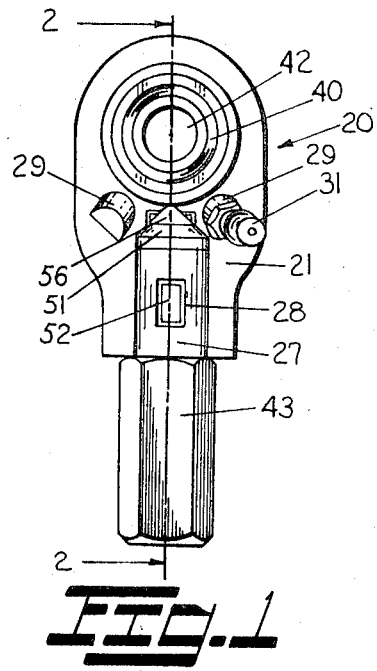
FIG. 1 is a plan view of a mechanically inter-locked self-aligning spherical bearing assembly in accordance with the present invention.
Figure 2:
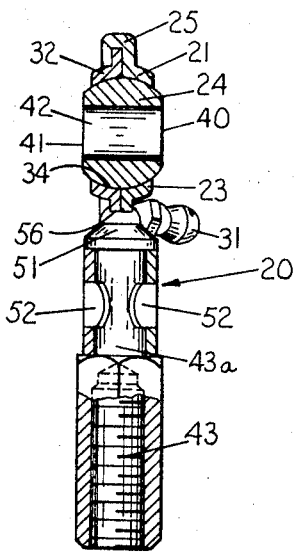
FIG. 2 is a longitudinal section taken on line 2—2 of the bearing of FIG. 1.

Referring more particularly to the drawings, FIGS. 1 and 2 show a self-aligning, rod end spherical bearing assembly embodying the concept of the present invention, wherein the rod end bearing is generally designated 20.

The various component and alternate parts of the rod end bearing 20 are depicted in FIGS. 3 through 8 and 11 through 18.

The rod end spherical bearing 20, which has superior load carrying characteristics, has a first housing member 21 and a second housing member 32. Both of the housing members are preferably of stamped sheet steel, such as stamped stainless steel, aluminum, brass, or the like. They may be heat treated and coated with anti-rust or hardness materials, as, for example, the housing members may be nickel-chromium plated.

Housing member 21 has a circular opening 22 therethrough which is defined by a spherical seating portion 23. Housing member 32 likewise has a circular opening 33, which is defined by a spherical seating portion 34.

A spherical ball 24 is rotatably enclosed within the housing members 21 and 32 and in alignment with the openings 22 and 33 and seated on the spherical seating portions 23 and 34. An interlocking member or raised sidewall 25, integral with the housing member 21, mechanically interlocks the housing member 21 to the housing member 32. The spherical ball 24 may have opposing truncated surfaces 40 and 41 with a central bore 42 therethrough, and the bore 42 is adapted for receiving any rod or shaft (not shown).

If desired, the spherical ball 24 and the spherical seating portions 23 and 34 could be lined with a self-lubricating plastic, as, for example, Teflon.

A stud 43 is also enclosed within the housing members 21 and 32. The stud 43 is provided to fasten the bearing unit in an operational position, as, for example, for interconnecting the bearing assembly to a linkage system. The shank portion 43a of the stud 43 is disposed within a cylindrical groove, which is defined by the semi-cylindrical portions 27 and 36 of the housing members 21 and 32, respectively.

The semi-cylindrical portions 27 and 36 emanate from openings 26 and 35 in housing members 21 and 32, respectively. The openings 26 and 35 may be shaped in a manner to receive the head 51 of the stud 43, as will be described in further detail below.

The semi-cylindrical portions 27 and 36, which form the cylindrical groove, may also be provided with openings 28 and 37, respectively, for receiving ribbed portions 52 on the shank 43a of the stud 43. The ribbed portions 52 resist rotation of the stud 43 as well as impart further mechanical rigidity to the entire bearing assembly.

As indicated above, a rod end spherical bearing is provided with a stud 43, which may be selected from a variety of shapes and sizes, depending upon, among other things, the function the bearing is to serve. In most applications of the bearing, it is desirable that the bearing be fixedly secured within the bearing housing. To that end, the head 51 may be shaped in such a manner that lips 56 are formed in the head for grasping the two housing members 21 and 32. The lips thereby impart further mechanical rigidity to the bearing assembly and compliment the action of the interlocking member 25. The lips will also resist rotational movement of the stud 43, which assists and compliments the anti-rotational action of the ribbed portions 52.

In some applications, however, rotation of the stud 43 may be desired, such as where excessive spherical ball misalignment is needed. Then, of course, the lips 56, as well as the slotted openings 28 and 37 and the ribbed portions 52, may be omitted.

In some other applications it may be desired to omit the stud 43 altogether and to provide for internal threading to be applied directly to the cylindrical groove of the housing members 21 and 32. In this regard openings 26, 35, 28 and 37 may also be omitted. The overall length of such a bearing assembly will be only as long as the overall length of the assembled housing members 21 and 32.

The stud 43 of the rod end spherical bearing of FIG. 1, and as also shown in FIG. 12, is a female-type; that is, the stud 43 is internally threaded. The stud 44 of FIG. 11 is essentially the same as stud 43, except that it has a male end (externally threaded). The stud 45 of FIG. 13 again is similar to stud 43, except that it is adapted to be integrally assembled into two bearing assemblies.

The stud 46 of FIG. 14 is a male adaptation of another type stud having a heavier head 46a and a nut portion 46b whereby the bearing may be turned as a unit as by a wrench.

The studs 47 and 48 of FIG. 15 and FIG. 16 are male and female adaptations, respectively, of still another type stud having elongated heads 47a and 48a with a multiplicity of anti-rotational ribbed portions 47b and 48b. The opening in the housing members 21 and 32 for receiving the ribbed portions 47b and 48b may be modified to enable the ribbed portion to clasp the portion of the housing members 21 and 32 therebetween to impart further mechanical rigidity to the entire bearing assembly.

The studs 49 and 50 of FIGS. 17 and 18 are male and female adaptations, respectively, of another type stud having heads 49a and 50a. The heads 49a and 50a have extended portions 49b and 50b, respectively, for the forming of lips during bearing assembly, which grasp the housing members 21 and 32 in a manner similar to the grasping action of lips 56 of FIG. 1.

Figure 19:
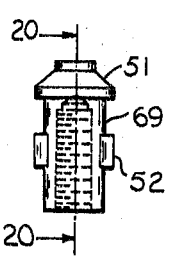
Figure 20:
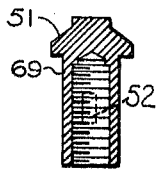
FIG. 20 is a longitudinal section taken on line 20—20 of the stud of FIG. 19.

The stud 69 of FIGS. 19 and 20 is a female-type (internally threaded) stud which is adapted to be disposed within the cylindrical groove defined by the semi-cylindrical portions 27 and 36 of the housing members 25 and 32. It can be seen that by making the length of the stud 69 equal to or less than the length of the cylindrical groove, the overall length of the entire bearing assembly will be only as long as the overall length of the assembled housing members 21 and 32. Of course, the length of the stud 69 could be extended beyond that of the cylindrical groove, if desired.

To provide lubrication of the spherical ball 24, either housing member 21 or 32 may be provided with a riser 29 that is in communication with a channel 30 leading to or near the spherical seating portions 23 and 34. A grease fitting 31 may be suitably inserted in the riser 29, as by drilling and tapping, for the pressurized introduction of grease into the spherical ball 24.

Other suitable means may be provided for the lubrication of the ball 24. As suggested above, the ball 24 or the seating portions may be lined with a self-lubricating plastic, such as Teflon, or further a self-lubricating intermediate liner (not shown) could also be utilized.

The method of assembling the spherical bearing of the present invention includes steps which are particularly suited for mass production techniques.

The housing member 21 and 32, as indicated before, are preferably of stamped sheet metal, such as stainless steel. Depending on the intended use, however, one or both of the housing members could be fabricated in some other method, such as by casting, so long as the resulting housing member is suitable for being mechanically interlocked in accordance with the present invention.

The fabricated housing members will be, before assembly, generally as shown in FIGS. 3 through 7, inclusive. They may be suitably heat treated and/or coated, depending upon the intended use.

Either housing member 21 or 32 may be placed on a suitable base (not shown) for pre-assembly of the spherical bearing unit. For the purposes of this description only, it will be understood that housing member 21 is first placed on the base and the various bearing components assembled thereon.

Accordingly, the spherical ball 24 is seated on the spherical seating portion 23 of the circular opening 22 and appropriate stud 43 is placed in the semi-cylindrical portion 27 with its head 51 disposed in the opening 26 and its ribbed portions 52 disposed in the slotted opening 27. After these components have been so placed on the housing member 21, then housing member 32 is placed on the base with respect to the housing member 21 such that the spherical ball is seated on the spherical seating portion 34 of the circular opening 33 and the stud 43 is disposed within the semi-cylindrical portion 32 with its head 51 disposed in the opening 35 and its ribbed portions 52 disposed in the openings 37. The above pre-assembly operation, of course, may be completely automated, whereby all the bearing component parts may be placed on the base automatically and/or simultaneously.

Figures 4, 6, 7:
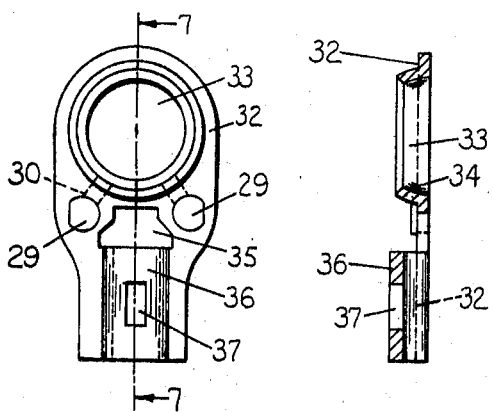
FIG. 4 is a longitudinal section taken along line 4—4 of the housing member of FIG. 3.
FIG. 6 is a plan view of the other housing member of the bearing of FIG. 1, which assemblies with the housing member of FIG. 3.
FIG. 7 is a longitudinal section taken along line 7—7 of the housing member of FIG. 6.
Figures 3, 5:
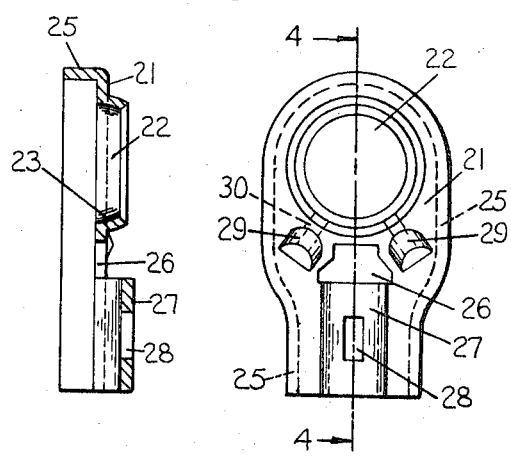
FIG. 3 is a plan view of one of the housing members of the bearing of FIG. 1, prior to assembly.
FIG. 5 is an end elevation of the housing member of FIG. 3.
Figure 8:
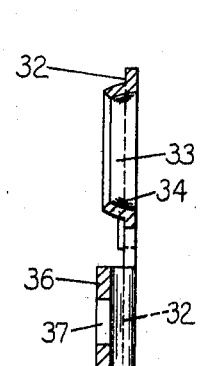
FIG. 8 is an end elevation of the housing member of FIG. 6.

A first forming die (not shown) may then be lowered to engage the pre-assembled bearing so as to fold the raised side wall 25 from its position as shown in FIG. 4 to substantially the position of the side wall 25 shown in FIG. 2.

A second forming die (not shown) may then be lowered to engage the partially formed bearing so as to completely fold the side wall 25 upon the housing member 32 as shown in FIG. 2. The so-folded side wall 25 thereby mechanically interlocks the housing member 21 to the housing member 32.

To compliment the mechanical rigidity imparted to the bearing assembly by the folded raised portion 25, the head may also be engaged by the die in such a manner that lips 56 are formed in the head for grasping the two housing members 21 and 32. To further enhance the mechanical rigidity of the bearing assembly, either of the forming dies could also engage the ribbed portions of the stud, as, for example, the forming die or dies could engage the ribbed portion 47b of stud 47 whereby they mechanically clasp a portion of the housing members 21 and 32.

The side wall 25, as depicted above, may be solely on one housing member and may be disposed at its outer periphery. It is to be understood, however, that, depending on a number of factors, including the design of the forming dies, a portion of the side wall could be on one housing member and another portion of the side wall could be on the other housing member.

Further, the folding is preferably done in two steps to reduce the stresses that may occur in the housing members during forming, particularly at the point of folding. However, the entire folding or forming operation could be done in a single step if the housing members were subjected to suitable metal conditioning procedures.

During the folding operation, the head 51 of the stud 43 assists the forming dies in aligning the two housing members 21 and 32 with respect to each other and with respect to the spherical ball 24. As with any spherical bearing, it is important that the spherical ball is properly positioned on the bearing seats. The forming dies are generally designed to assure that the proper alignment is achieved. However, a small amount of misalignment of the overall bearing assembly may still occur from improper pre-assembly alignment.

As before indicated, the housing members 21 and 32 are provided with openings 26 and 35, which receive the head 51 of stud 43. By pre-assembling the bearing before forming the head 51, which is in contact with both housing members at the openings 26 and 35, fixes the proper pre-assembly position of the two housing members and, consequently, the proper pre-assembly position of the spherical ball 24. The head 51 and ball 24 will also assist the forming dies in maintaining proper alignment during the forming steps.

Other modifications of the present invention are as shown in FIGS. 9 and 10, wherein 57 and 65 each generally refer to mechanically interlocked pillow block assemblies.

So-called pillow block assemblies are useful in many areas, such as providing a bearing support for the shafts of small motors.

Pillow block 57 comprises a first housing member 58 and a second housing member 60. Both of the housing members are preferably of stamped steel, such as stamped stainless steel, or the like. They may be heat-treated and coated with anti-rust or hardness materials, as, for example, the housing members may be nickel-chromium plated.

Housing member 58 has a circular opening therethrough (not shown), which is defined by a spherical seating portion (not shown). Housing member 60 likewise has a circular opening 61, which is defined by a spherical seating portion 61b.

A spherical ball 62 is rotatably enclosed within the housing members 58 and 60 and in alignment with the openings and seated on the spherical seating portions.

An interlocking member or raised side wall 59, integral with the housing member 58, mechanically interlocks the housing member 58 to housing member 60. The spherical ball 62 may have opposing truncated surfaces with a central bore 63 therethrough, and the bore 63 is adapted for receiving any rod or shaft (not shown).

Housing members 58 and 60 are also provided with holes 64 for fastening, as by bolting, the pillow block assembly 57 in an operating position. Pillow block assembly 65 of FIG. 10 is similar to pillow block assembly 57, except that housing member 66 has an extension provided with holes 67 for achieving a different positional mode of fastening.

Obviously, the present invention is not limited to the specific details as herein described, but is capable of other modifications and changes without departing from the spirit and scope of the appended claims.

I claim:

1. A method of manufacturing a self-aligning, spherical bearing assembly comprising the steps of fabricating first and second housing members, each of which having circular openings defined by a spherical seating portion, and at least one of said housing members having integral mechanical interlocking means, pre-assembling said housing members with a spherical ball such that said spherical ball is rotatably enclosed within said housing members and in alignment with said openings and seated on said seating portions, mechanically interlocking said two housing members with said integral mechanical interlocking means.

2. A method of manufacturing a self-aligning, spherical bearing assembly, as set forth in claim 1, in which fabricating said first and second housing members includes stamping said first and second housing members from sheet metal.

3. A method of manufacturing a self-aligning, spherical bearing assembly, as set forth in claim 1, in which the interlocking means includes an integral raised side wall extending at least partially around the outer periphery of at least one of said housing members.

4. A method of manufacturing a self-aligning, spherical bearing assembly, as set forth in claim 3, in which the raised side wall is integral with said first housing member and is adapted to be folded over upon said second housing member.

5. A method of manufacturing a self-aligning, spherical bearing assembly, as set forth in claim 4, in which a first forming means partially folds said raised side wall over said second housing member, and a second forming means completes folding said raised side wall over said second housing member.

* * * * *